United States Patent [19]
Roth et al.

[11] Patent Number: 5,822,730
[45] Date of Patent: Oct. 13, 1998

[54] LEXICAL TREE PRE-FILTERING IN SPEECH RECOGNITION

[75] Inventors: Robert Roth, Newtonville; James K. Baker, West Newton; Laurence S. Gillick, Newton; Alan Walsh, Waltham, all of Mass.

[73] Assignee: Dragon Systems, Inc., Newton, Mass.

[21] Appl. No.: 701,393

[22] Filed: Aug. 22, 1996

[51] Int. Cl.$^6$ ............................................. G10L 5/06
[52] U.S. Cl. ................................. 704/255; 704/252
[58] Field of Search ................................. 704/251–257

[56] References Cited

U.S. PATENT DOCUMENTS

| | | | |
|---|---|---|---|
| 4,805,219 | 2/1989 | Baker et al. ............................ | 381/43 |
| 4,833,712 | 5/1989 | Bahl et al. ............................. | 381/43 |
| 4,837,831 | 6/1989 | Gillick et al. .......................... | 381/43 |
| 5,526,463 | 6/1996 | Gillick et al. .......................... | 395/2.6 |

OTHER PUBLICATIONS

Woods et al., "Uses of Higher Level Knowledge in a Speech Understanding System: A Progress Report," ICASSP (1976), pp. 438–441.

Klovstad, "Probabilistic Lexical Retrieval Component with Embedded Phonological Word Boundary Rules," Bolt Beranek and Newman, Inc., Cambridge, MA, p. 578, abstract of paper.

El meliani, R. et al. "A Syllabic Filler Basec Continuos Recognizer for Unlimited Vocabulary." Electrical and Computer Engineering, 1995 Canadian Conference.

*Primary Examiner*—David R. Hudspeth
*Assistant Examiner*—M. David Sofocleous
*Attorney, Agent, or Firm*—Fish & Richardson P.C.

[57] ABSTRACT

A speech recognition technique uses lexical tree pre-filtering to obtain lists of words for use in performing speech recognition. The lexical tree pre-filtering includes representing a vocabulary of words using a lexical tree and identifying a first subset of the vocabulary that may correspond to speech spoken beginning at a first time by propagating through the lexical tree information about the speech spoken beginning at the first time. A second subset of the vocabulary that may correspond to speech spoken beginning at a second time is identified by propagating through the lexical tree information about the speech spoken beginning at the second time. Words included in the speech are recognized by comparing speech spoken beginning at the first time with words from the first subset of the vocabulary and speech spoken beginning at the second time with words from the second subset of the vocabulary. The state of the lexical tree is not reset between identifying the first and second subsets.

30 Claims, 7 Drawing Sheets

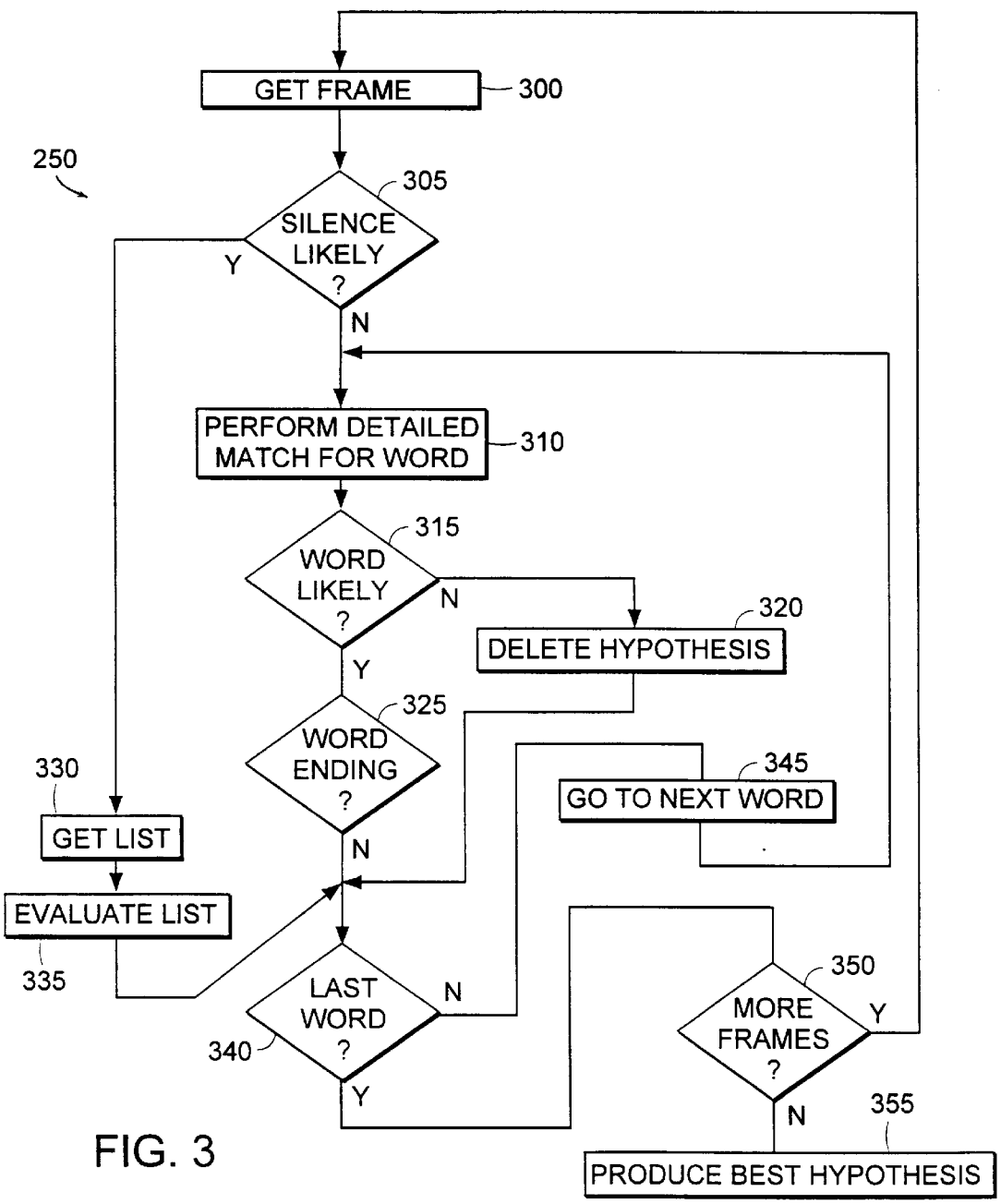

| FRAME | 800 ("A") | 705 ("B") | 710 ("C") | 715 ("D") | NEXT NODE ("N") |
|---|---|---|---|---|---|
| 900 ~ 0 | 0 | — | — | — | — |
| 905 ~ 1 | $S_{A1}=A_{A1}$ | $S_{B1}=A_{B1}$ | — | — | — |
| 910 ~ 2 | $S_{A2}=A_{A1}+A_{A2}$ | $S_{B2}=\min(S_{B1}+stay_{B1}, S_{A1})+A_{B2}$ | $S_{C2}=S_{B1}+leave_B +A_{C2}$ | — | — |
| 915 ~ 3 | $S_{A3}=A_{A2}+A_{A3}$ | $S_{B3}=\min(S_{B2}+stay_B, S_{A2})+A_{B3}$ | $S_{C3}=\min(S_{C2}+stay_C, S_{B2}+leave_B)+A_{C3}$ | $S_{D3}=S_{C2}+leave_C +A_{D3}$ | — |
| 920 ~ 4 | $S_{A4}=A_{A3}+A_A$ | $S_{B4}=\min(S_{B3}+stay_B, S_{A3})+A_{B4}$ | $S_{C4}=\min(S_{C3}+stay_C, S_{B3}+leave_B)+A_{C4}$ | $S_{D4}=\min(S_{D3}+stay_D, S_{C3}+leave_C)+A_{D4}$ | $S_{D4}=S_{D3}+leave_D +A_{D4}$ |
| ••• | | | | | |
| 925 ~ n | $S_{An}=A_{An-1}+A_{An}$ | $S_{Bn}=\min(S_{Bn-1}+stay_B, S_{An-1})+A_{Bn}$ | $S_{Cn}=\min(S_{Cn-1}+stay_C, S_{Bn-1})+leave_B+A_{Cn}$ | $S_{Dn}=\min(S_{Dn-1}+stay_D, S_{Cn-1}+leave_C)+A_{Dn}$ | $S_{Nn}=\min(S_{Nn-1}+stay_M, S_{Mn-1}+leave_M)+A_{Nn}$ |

FIG. 9

| FRAME | 800 ("A") | 705 ("B") | 710 ("C") | 715 ("D") | NEXT NODE ("N") |
|---|---|---|---|---|---|
| 900 ~ 0 | $S_{A0}=0$ | — | — | — | — |
| 905 ~ 1 | $S_{A1}=f(S_{A0}+A_{A1})$ | $S_{B1}=f(S_{A0}+A_{B1})$ | — | — | — |
| 910 ~ 2 | $S_{A2}=f(S_{A1}+A_{A2})$ | $S_{B2}=f(S_{B1}+stay_B, S_{A1},A_{B2})$ | $S_{C2}=f(S_{B1},leave_B, A_{C2})$ | — | — |
| 915 ~ 3 | $S_{A3}=f(S_{A2}+A_{A3})$ | $S_{B3}=f(S_{B2}+stay_B, S_{A2}),A_{B3}$ | $S_{C3}=f(S_{C2}+stay_C, S_{B2}+leave_B,A_{C3})$ | $S_{D3}=f(S_{C2},leave_C, A_{D3})$ | — |
| 920 ~ 4 | $S_{A4}=f(S_{A3}+A_{A4})$ | $S_{B4}=f(S_{B3}+stay_B, S_{A3})+A_{B4}$ | $S_{C4}=f(S_{C3}+stay_C, S_{B3}+leave_B,A_{C4})$ | $S_{D4}=f(S_{D3},stay_D, S_{C3}+leave_C)+A_{D4}$ | $S_{N4}=f(S_{D3}+leave_D +A_{D3})$ |
| ••• | | | | | |
| 925 ~ n | $S_{An}=f(S_{An-1},A_{An})$ | $S_{Bn}=f(S_{Bn-1}+stay_B, S_{An-1},A_{Bn})$ | $S_{Cn}=f(S_{Cn-1}+stay_C, S_{Bn-1},leave_B+A_{Cn})$ | $S_{DN}=f(S_{Dn-1},stay_D, S_{Cn-1},leave_C,+A_{Dn})$ | $S_{Nn}=f(S_{Dn-1}+stay_N, S_{Nn-1}+leave_N)+A_{Nn}$ |

LEXICAL TREE PRE-FILTERING IN SPEECH RECOGNITION

BACKGROUND OF THE INVENTION

The invention relates to speech recognition.

Speech recognition systems analyze a person's speech to determine what the person said. Typically, a processor divides a signal that represents the speech into a series of digital frames that each represent a small time increment of the speech. The processor then compares the digital frames to a set of speech models. Each speech model may represent a word from a vocabulary of words. A speech model also may represent a sound, or phoneme, that corresponds to a portion of a word. The processor determines what the person said by finding the speech models that correspond best to the digital frames that represent the person's speech. Speech recognition is discussed in U.S. Pat. No. 4,805,218, entitled "Method for Speech Analysis and Speech Recognition", which is incorporated by reference.

Each comparison with a speech model requires a relatively large number of calculations. A speech recognition system may include tens of thousand of words in its vocabulary, with each word having a corresponding speech model. Accordingly, the number of calculations required to compare a sequence of digital frames against models of every word in the vocabulary would be extensive. For this reason, the processor uses a pre-filtering procedure, also known as a rapid match procedure, to select a subset of words from the vocabulary. The processor then compares speech models corresponding to the pre-filtered words to the digital frames representing the person's speech to determine what the person has said. One approach to pre-filtering is discussed in U.S. Pat. No. 5,202,952, entitled "Large-Vocabulary Continuous Speech Prefiltering and Processing System", which is incorporated by reference.

SUMMARY OF THE INVENTION

In general, the invention features using lexical tree pre-filtering to identify sets of words for use in recognizing speech. Initially, a vocabulary of words is represented using a lexical tree. Thereafter, a first subset of the vocabulary that may correspond to speech spoken beginning at a first time is identified by propagating information about the speech spoken beginning at the first time through the lexical tree. The propagation may include performing a relatively coarse comparison of the speech with words in the lexical tree. A second subset of the vocabulary that may correspond to speech spoken beginning at a second time is identified in the same manner. Words included in the speech are recognized by comparing speech spoken beginning at the first time with words from the first subset of the vocabulary and speech spoken beginning at the second time with words from the second subset of the vocabulary. The state of the lexical tree is not reset between identifying the first and second subsets. Speech spoken beginning at the first time may overlap speech spoken beginning at the second time.

Embodiments of the invention may include one or more of the following features. The coarse comparison may include propagating scores through the lexical tree. The scores may be maintained as negative logarithmic values, which simplifies processing of the scores.

A starting time may be associated with each score and moved with the score as the score propagates through the lexical tree. A word may be produced by the coarse comparison when a score corresponding to the word propagates out of a node of the lexical tree corresponding to the word. The starting time propagates out with the score and corresponds to the time at which the word was spoken.

The first subset of the vocabulary may be a first list of words, and words produced by the coarse comparison may be added to the first list of words. When a first time is associated with the first list of words, a word is added to the first list of words when a starting time associated with a score corresponding to the word equals the first time.

Multiple lists of words, each of which is associated with a particular time, may be maintained. A word produced by the coarse comparison may be added to lists of words that are associated with times that precede or follow the starting time of the word by up to a certain time interval. The time interval may be related to the length of the word. For example, the time interval may be selected so that the word is added to lists spread over a time period that corresponds to the length of the word.

Scores produced for the words during the coarse comparison also may be stored in the lists. The score of a word may be modified when the word is added to a list that corresponds to a time that differs from the starting time of the word. The score may be modified based on the difference between the first time and a time associated with a particular list of words to produce a modified score.

The lexical tree may include nodes that each represent a phoneme so that each word of the vocabulary is represented by a sequence of nodes that together correspond to a sequence of phonemes that define the word. Scores may be propagated through the lexical tree by propagating scores between the nodes of the lexical tree.

A language model score that represents a likelihood with which a word including the phoneme represented by the node occurs in speech may be associated with each node. The language model score associated with a node may be added to a score propagating from the node. The language model score associated with a node may correspond to an increase in a best language model score from a branch of the lexical tree that starts with a parent of the node to a branch of the lexical tree that starts with the node.

Scores may be normalized as they propagate through the lexical tree. For example, an updated version of the best score for a time increment may be subtracted from the scores for a subsequent time increment.

Other features and advantages will become apparent from the following description, including the drawings, and from the claims.

BRIEF DESCRIPTION OF THE DRAWING

FIG. 2 is a block diagram of procedures performed by the speech recognition system of FIG. 1.

FIGS. 3 and 4 are flow charts of the procedures of FIG. 2.

FIGS. 9 and 10 are charts of scores corresponding to the states of the state graphs of FIGS. 7 and 8.

DESCRIPTION OF THE PREFERRED EMBODIMENTS

Figure 1:
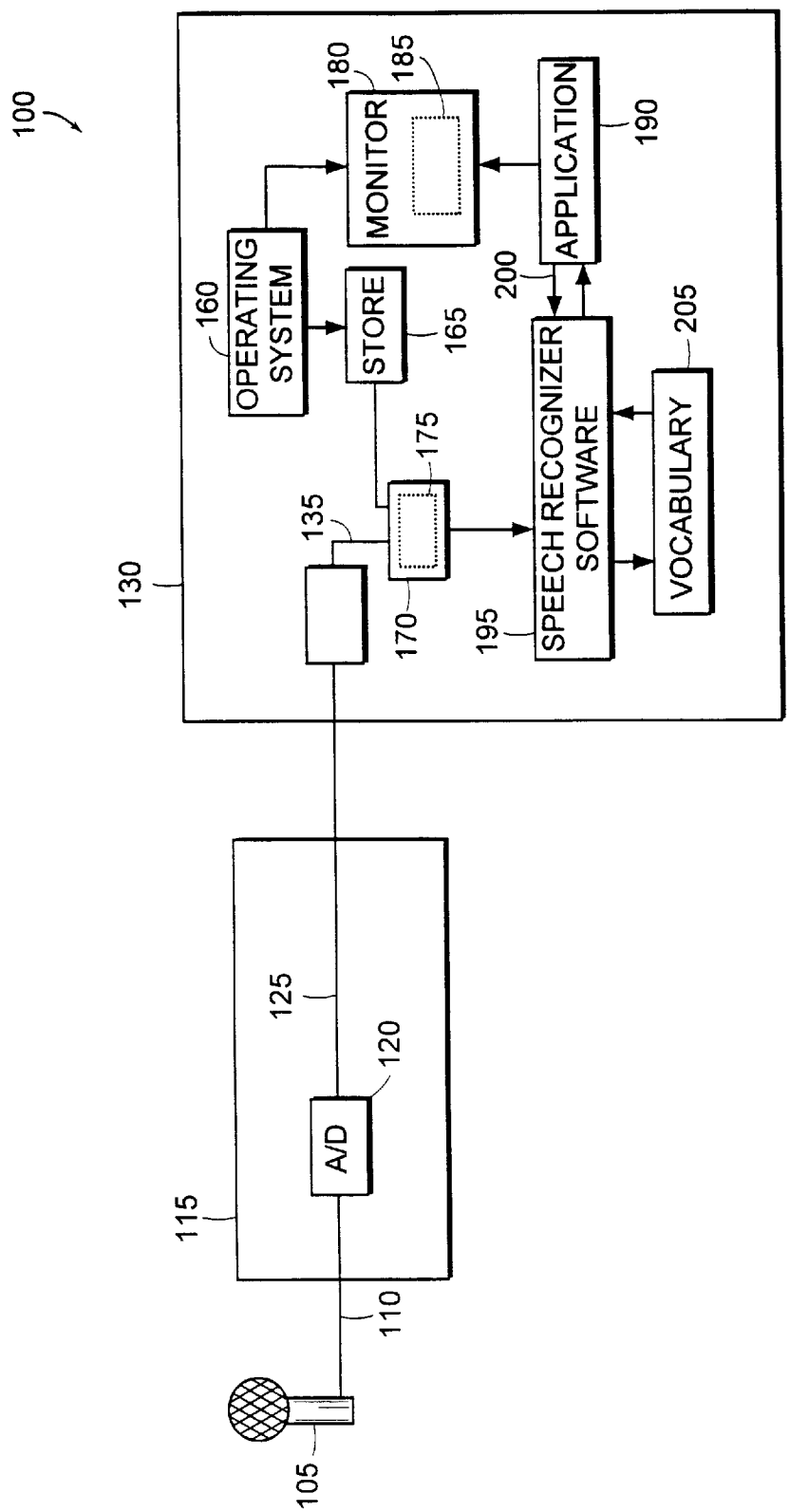
FIG. 1 is a block diagram of a continuous speech recognition system.

Referring to FIG. 1, a speech recognition system 100 includes an input device such as a microphone 105. When a person speaks into the microphone 105, the microphone produces an analog electrical signal 110 that represents the person's speech. A sound card 115 is connected to the microphone 105 to receive the analog electrical signal 110. The sound card includes an analog-to-digital (A/D) converter 120. The A/D converter 120 periodically samples the analog electrical signal 110 to produce a digital signal 125. For example, the A/D converter 120 may use a sampling rate of about 11 kHz so that the digital signal 125 includes 220 digital samples during a 20 millisecond time period. Each 20 millisecond time period corresponds to a frame of the digital signal 125.

The digital signal 125 is then transferred to a processor 130. The processor processes the samples corresponding to each frame of the digital signal 125 to produce a set of parameters 135 that represent the frequency content of the frame (i.e., the energy of the frame in different frequency bands) of the digital signal 125 (and the corresponding 20 millisecond time period of the analog signal 110 that represents the person's speech). Parameter types may include frequency parameters, cepstral parameters, and signals derived from the frequency parameters and cepstral parameters. Frequency parameters represent the content of the speech at each of a set of frequency bands and are generated using a fast fourier transform (FFT). Cepstral parameters are generated by performing a cosine transformation on logarithms of the frequency parameters. Cepstral parameters have been found to emphasize information important to speech recognition more effectively than frequency parameters. The processor may combine the cepstral parameters using an IMELDA linear combination transformation or similar techniques.

Operating system software 160 running on the processor includes a store routine 165. The store routine 165 stores the sets of parameters 135 in a buffer 170. When parameters for a sufficient number of frames have been stored in the buffer 170, the store routine 165 organizes the sets of parameters into a speech packet 175.

The operating system software 160 also includes monitor software 180. Monitor software 180 keeps a count 185 of the number of speech packets 175 stored but not yet processed. An application 190 (e.g., a word processor) being executed by the processor 130 periodically checks for utterances (i.e., speech) by examining the count 185. If the count 185 is zero, then there is no utterance. If the count 185 is not zero, then the application 190 calls speech recognition software 195 and passes a pointer 200 to the location of the speech packet in buffer 170. For a more detailed description of how utterances are received and stored within a speech recognition system, see U.S. Pat. No. 5,027,406, entitled "Method for Interactive Speech Recognition and Training", which is incorporated by reference.

Speech recognition software 195 determines what words have been spoken by causing the processor 130 to retrieve speech frames from speech packet 175 and compare the speech frames to speech models stored in a vocabulary 205. The speech recognition software then causes the processor to supply text versions of the spoken words to the application 190. Speech recognition software 195 controls the processor to perform continuous speech recognition. This means that the speech recognition software does not require the person speaking into the microphone 105 to pause between words to permit the software to recognize the words. For a more detailed description of continuous speech recognition, see U.S. Pat. No. 5,202,952, entitled "Large-Vocabulary Continuous Speech Prefiltering and Processing System".

Referring to FIG. 2, the processor 130 performs two procedures in parallel. The processor uses a speech recognition procedure 250 to determine what a person has said by comparing the digital frames representing the person's speech to speech models from the vocabulary 205. The processor uses a pre-filtering procedure 255 to produce from the vocabulary 205 a list of words that are likely to match the words spoken by the person starting at a particular time. The processor then uses the speech recognition procedure 250 to compare speech models for those words to the digital frames representing the person's speech.

The vocabulary 205 includes tens of thousands of words. The number of calculations required to compare a sequence of digital frames against models of every word in the vocabulary would be extensive. The processor 130 uses the pre-filtering procedure 255 to reduce the required number of calculations. The pre-filtering procedure performs a coarse comparison of the sequence of digital frames with the vocabulary to identify a subset of the vocabulary for which a more extensive comparison using the recognition procedure 250 is justified.

The recognition procedure 250 calls the pre-filter procedure 255 by asking the pre-filter procedure 255 to provide a list 260 of words that may have been spoken starting at a start time 265. The pre-filter procedure 255 responds with the requested list 260.

The speech recognition procedure 250 is illustrated in FIG. 3. The processor 130 uses the procedure 250 to produce a hypothesis as to the sequence of words that is most likely to have been spoken in a time period that begins and ends with silence. Initially, the processor retrieves a frame of digital data (step 300). The processor then determines whether the frame corresponds to silence or is likely to correspond to silence (step 305). The first frame always corresponds to silence.

If a word needs to be considered for the frame, then the processor 130 performs a detailed match to determine whether the word was likely to have been spoken by the user (step 310). To make the detailed match, the processor compares the frame against a speech model for the word. The processor uses the comparison to update a score for the word. For ease of processing, scores are maintained as negative logarithmic values. Accordingly, a lower score indicates a better match (a high probability) while a higher score indicates a less likely match (a lower probability), with the likelihood of the match decreasing as the score increases.

After performing the detailed match, the processor determines whether the user was likely to have spoken the word (step 315). The processor makes this determination by comparing the current score for the word (or for a portion of the word) to a threshold value. If the score exceeds the threshold value, then the processor determines that the word is too unlikely to merit further consideration and deletes the hypothesis that includes the word (step 320).

If the processor determines that the word was likely to have been spoken by the user, then the processor determines whether the word is ending (step 325). The processor determines that a word is ending when the frame corresponds to the last component of the model for the word.

If the processor determines that a word is ending (step 325), or if the processor had determined that the frame was likely to correspond to silence (step 305), then the processor obtains a list of words that may start with the next frame (step 330). The processor obtains the list of words by sending a request to the pre-filter procedure 255 for a list of words that may start with the next frame. If the processor has requested already the list of words that start with that frame, then the processor reuses the list and does not make an additional request.

After obtaining the list of words, the processor evaluates the list of words (step 335). As discussed in detail below, the list of words returned by the pre-filter procedure 255 includes a score associated with each word. The processor evaluates each list word by modifying the list score ($S_L$) for the word to produce a modified list score ($S_{ML}$) as:

$$S_{ML} = S_L + L_C - L_L,$$

where $L_C$ is a language model score that represents the frequency with which the pair of words that includes the list word and the immediately preceding word in the hypothesis that includes the list word are used together in speech, and $L_L$ is a language model score included in the list score and corresponds to the frequency with which the list word is used in speech, without reference to context. The processor then adds the modified list score to the score for the hypothesis that includes the list word (i.e., the score for the word or series of words that is believed to precede the list word in the speech under consideration) and compares the result to a threshold value. If the result is less than the threshold value, then the processor maintains the hypothesis that includes the list word (i.e., the processor will consider the list word when processing the next frame). Otherwise, the processor determines that the list word does not merit further consideration and abandons the hypothesis that includes the list word.

After evaluating the list of words (step 335), determining that a word is not ending (step 325), or deleting a hypothesis (step 320), the processor determines whether the word under consideration is the last word to be considered for the frame (step 340). If the word is not the last word, then the processor goes to the next word (step 345) and performs a detailed match for that word (step 310).

If the word is the last word for the frame, then the processor determines whether there are more speech frames to be processed (step 350). The processor determines that there are more speech frames to process when two conditions are met. First, there must be more frames to process. Second, the best scoring node for the current frame or for one or more of a predetermined number of immediately preceding frames must have been a node other than the silence node (i.e., there are no more speech frames to process when the silence node is the best scoring node for the current frame and for a predetermined number of consecutive preceding frames). If there are more speech frames to process, then the processor retrieves the next frame (step 300) and repeats the procedure.

If there are no more speech frames to process, then the processor produces the words corresponding to the most likely hypothesis as representing the speech (step 355). Detailed discussions of speech recognition techniques are provided in U.S. Pat. No. 4,805,218, entitled "Method for Speech Analysis and Speech Recognition", and U.S. Pat. No. 5,202,952, entitled "Large-Vocabulary Continuous Speech Prefiltering and Processing System".

Figure 4:
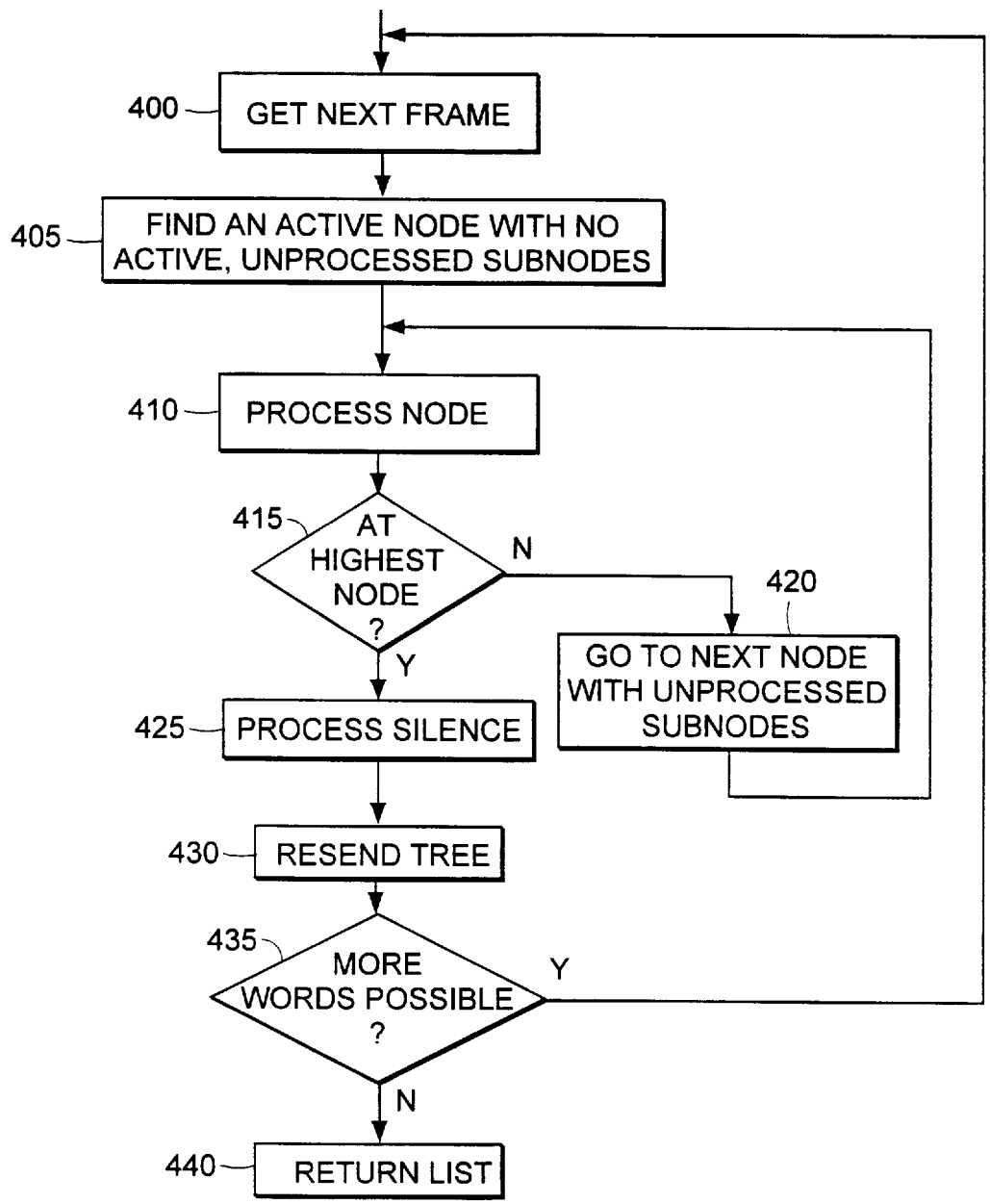

The lexical tree pre-filtering procedure 255 is illustrated in FIG. 4. Before beginning processing of the speech recognition procedure 250, the processor initializes a lexical tree. The lexical tree represents the vocabulary 205 based on the phonetic relationships between words in the vocabulary. Each node of the lexical tree represents a phoneme (i.e., a sound that corresponds to a portion of a word or words).

Figure 5:
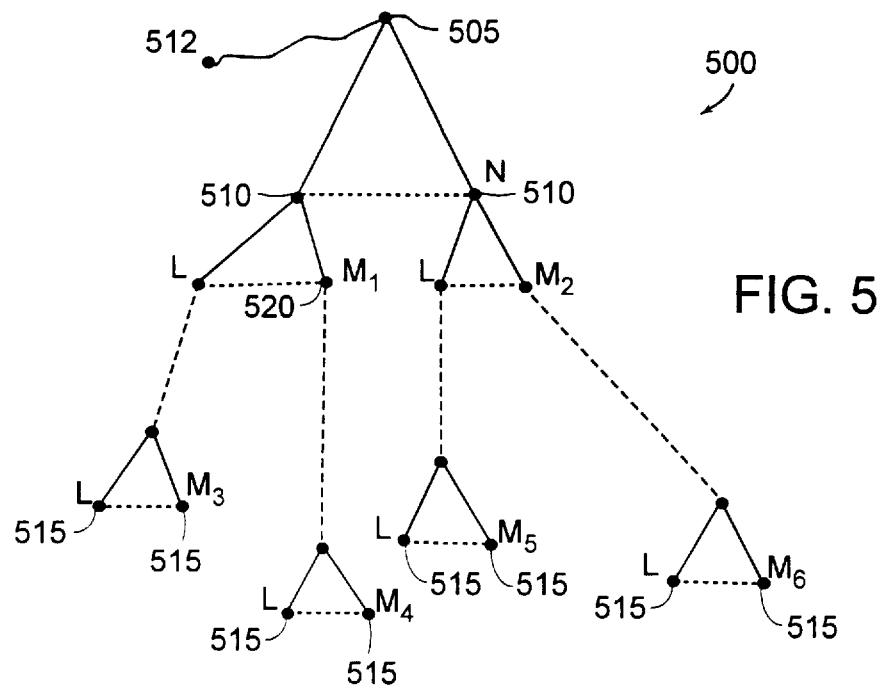
FIG. 5 is a graph of a lexical tree.
Figure 6:
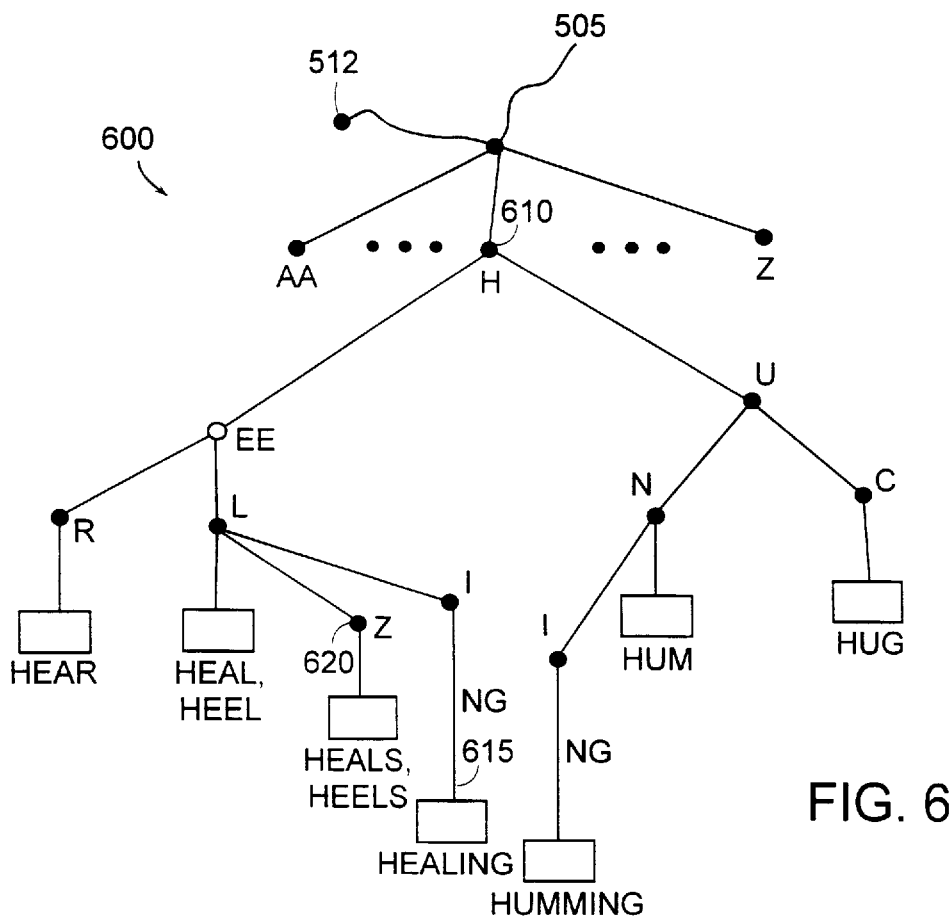
FIG. 6 is a graph of a portion of the lexical tree of FIG. 5.

Referring to FIGS. 5 and 6, the lexical tree 500 includes a root node 505 that represents new words entering the lexical tree. From the root node 505, the tree expands to a group 510 of nodes that correspond to phonemes with which words start. A silence node 512 that represents silence also may be reached from the root node 505.

Each node in the group 510 represents a phoneme that appears at the beginning of one or more words. For example, in the portion 600 of the lexical tree 500 that is illustrated in FIG. 6, a node 610 corresponds to all words in the vocabulary that start with the phoneme "H". Together, the nodes in the group 510 include representations of the starting phoneme of every word in the vocabulary.

The lexical tree continues to expand until it reaches leaf nodes 515 that represent the actual words of the vocabulary. For example, as indicated by the square marker, leaf node 615 of FIG. 6 corresponds to the word "healing". An internal node of the tree also may represent a word of the vocabulary. For example, the node 520 might represent a particular vocabulary word in addition to representing the first two phonemes of other vocabulary words. Similarly, the leaf node 620 of FIG. 6 corresponds to the words "heal" and "heel" while also corresponding to the first three phonemes of the words "heals", "heels" and "healing". Node 620 also illustrates that, since multiple words may have the same phonetic spelling, a leaf node may correspond to more than one word. As illustrated in FIG. 6, leaf nodes may appear at different levels within the lexical tree.

Referring again to FIG. 4, the processor 130 begins the pre-filtering procedure 255 by retrieving the next frame of data from the speech packet 175 (step 400). Immediately after initialization, the next frame of data will be the first frame of data in the speech packet 175. Thereafter, the next frame of data will be the frame of data following the last frame of data that was processed by the prefiltering procedure. It is important to note that the prefiltering procedure 255 does not reinitialize the lexical tree between list requests. Accordingly, the state of the lexical tree when a list of words is requested corresponds to the state of the lexical tree after a previous list of words was returned.

After retrieving a frame of data, the processor 130 finds an active node in the tree with no unprocessed active successors (step 405). Successors of a node also may be referred to as subnodes of the node. When the lexical tree is initialized, the silence node 512 is the only active node.

Starting with a node having no unprocessed active subnodes reduces the memory required to process the nodes. As discussed below, changes to the lexical tree propagate down through the tree (i.e., from the root node to the leaf nodes). Since changes to nodes that are lower in the tree do not impact processing of nodes that are higher in the tree, the processor is able to process the nodes without creating a second copy of the lexical tree in memory by starting with a node having no unprocessed active subnodes.

Next, the processor 130 processes the current node (step 410). While processing the node, the processor determines whether the node should spawn additional active nodes and whether the node should be rendered inactive. If the node is a leaf node, the processor also determines whether the word corresponding to the node should be added to a word list for a time associated with the node.

After processing the node (step 410), the processor 130 determines whether the node is the highest node in the tree (i.e., the root node) (step 415). If the node is not the highest node, then the processor goes to the next node having no unprocessed active subnodes (step 420) and processes that node (step 410). It is important to note that, when searching for the next node to process, the processor considers inactive nodes having active subnodes or active siblings.

If the processed node is the highest active node (step 415), then the processor 130 processes the silence node 512 (step 425). In general, the silence node is processed by comparing the frame to a model for silence and adding the resulting score to the minimum of the current score for the silence node and the score for the root node 505. Node processing is discussed in more detail below.

Next, the processor reseeds the lexical tree (step 430). As discussed below, the processor reseeds the tree whenever the silence node 512 is active or a word was produced by a leaf node of the lexical tree, regardless of whether the word was added to the list of words. The processor reseeds the tree by replacing the score for the root node 505 with the minimum of the score for the silence node 512 and the scores for any words produced by leaf nodes of the lexical tree for the current frame. If the silence node is inactive and no leaf node has produced a word, then the processor replaces the score for the root node 505 with a bad score (i.e., a score having a value larger than a pruning threshold).

Next, the processor 130 determines whether more words may be added to the word list for the requested time (step 435). If there are no active nodes in the lexical tree corresponding to speech that started at, before, or slightly after the start time for which the list was requested, and if the last frame to be processed corresponds to a time that is slightly after the start time for which the list was requested, then no more words may be added to the word list. As noted below, a word produced by the lexical tree is added to the list of words corresponding to the start time of the word and to lists of words corresponding to times that precede and follow the start time of the word. It is for this reason that the processor waits until there are no active nodes in the tree corresponding to speech that started slightly after the start time for the list of words. If more words may be added, then the processor retrieves the next frame of data from the speech packet 175 (step 400) and repeats the steps discussed above.

If words cannot be added to the word list (step 435), then the processor returns the word list (step 440) to the procedure 250. If the word list includes more than a predefined number of words, then the processor 130 removes words from the list prior to returning the list. The processor removes the words that are least likely to correspond to the user's speech and removes enough words to reduce the number of words on the list to the predefined number. The processor also deletes any lists of words for times prior to the requested start time.

Figure 7:
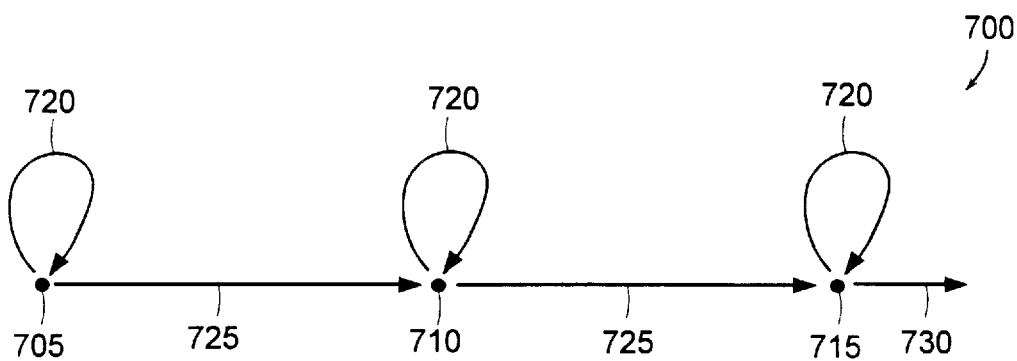
FIGS. 7, 8A and 8B are state graphs representing nodes of the lexical tree of FIG. 5.

Each node of the lexical tree 500 (FIG. 5) represents a sequence of states for a particular phoneme. For example, FIG. 7 illustrates a node 700 that includes a first state 705, a second state 710, and a third state 715. A comparison with a digital frame may cause the score in a particular state to remain in the state (through a path 720). A score remains in the state when the score, after being adjusted based on a comparison with a model for the state, is better than a score passed from a preceding state or node, or when no score is passed from a preceding state or node. The comparison also may cause the score to be passed to a subsequent state through a path 725. A score is passed to a subsequent state when the score, after being adjusted based on a comparison with a model for the subsequent state, is better than the score in the subsequent state, or when no score is associated with the subsequent state. The score for the third state 715 may be passed to one or more subsequent nodes through a path 730.

Figure 8A:
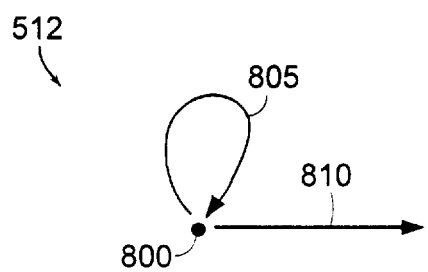

Referring to FIG. 8A, the node 512 that corresponds to silence is represented by a single state 800. Each comparison with a digital frame may cause a score in the node to remain in the state 800 (through the path 805) and also may cause the score to be passed to the root node 505 through a path 810.

Figure 8B:
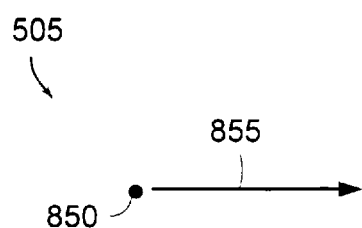

Referring to FIG. 8B, the root node 505 is represented by a single state 850. Comparison with a frame causes the score in the node to be passed to one or more subsequent nodes (including the silence node 512) through a path 855.

Each state of a node may be represented by four values: a score, a starting time, a leaving penalty, and a staying penalty. The score represents the likelihood that a series of digital frames has placed the lexical tree in the state (i.e., the probability that the series of frames corresponds to the word or portion of a word to which the state corresponds). As noted, the scores are maintained as negative logarithmic values.

The starting time identifies the hypothesized time at which the person began to speak the word or words represented by the state. In particular, the starting time identifies the time at which the score associated with the state entered the lexical tree (i.e., the time at which the score was passed from the state 800 along the path 810).

The leaving and staying penalties are fixed values associated with the state. The staying penalty is added to any score that stays in the state. The staying penalty is related inversely to the length of the sound represented by the state and to the length of the phoneme represented by the node to which the state belongs. For example, the staying penalty could be proportional to $-\log(1-1/d_{avg})$, where $d_{avg}$ is the average duration, in frames, of the sound represented by the state. Thus, the staying penalty has a relatively large value when the sound corresponding to the state occurs for only a small amount of time and a relatively small value when the sound corresponding to the state occurs for a large amount of time.

The leaving penalty is added to any score that exits the state, and includes a duration component and a language model component. The duration component is related directly to the length of the sound represented by the state and to the length of the phoneme represented by the node to which the state belongs. For example, the duration component of the leaving penalty could be proportional to $-\log(1/d_{avg})$. Thus, the duration component of the leaving penalty has a relatively large value when the sound corresponding to the state occurs for a large amount of time and a relatively small value when the sound corresponding to the state occurs for a small amount of time.

The language model components of the leaving penalties for all states in a particular node together represent a language model score for the phoneme associated with that node. The language model score represents the likelihood that a word including the phoneme will occur in speech. The language model score included in the leaving penalties for a node is the increase in the best language model score for the branch of the lexical tree that begins with the node relative to the branch of the lexical tree that begins with the node's parent.

The following discussion assumes that there are no leaving or staying penalties associated with the state 800 or the state 850. The same result could be achieved by setting the leaving and staying penalties for states 800 and 850 equal to zero. The following discussion also assumes that the first frame is the first frame that may correspond to speech instead of silence.

FIG. 9 provides a simplified example of how scores propagate through the lexical tree. Before the first frame is retrieved (row 900), state 800 (which corresponds to silence) has a score of 0 and no other nodes are active. The score of 0 means that there is a one hundred percent probability that the system is starting from silence.

After the first frame is retrieved (row 905), the score for the state 800 ($S_{A1}$) is set equal to the acoustic score ($A_{A1}$) resulting from an acoustic match of the first frame with the acoustic model corresponding to the state 800 (i.e., the acoustic model for silence). Thus, the score for the state 800 ($S_{A1}$) is set equal to the likelihood that the first frame corresponds to silence.

Retrieval of the first frame also causes the state 705 to become an active state. Assuming that the node 700 corresponds to a phoneme that starts a word, the score for the state 705 ($S_{B1}$) is set equal to the acoustic score ($A_{B1}$) resulting from an acoustic match of the first frame with the acoustic model corresponding to the state 705. Thus, the score for the state 705 ($S_{B1}$) is set equal to the likelihood that the first frame corresponds to the state 705. The starting time for the state 705 is set equal the time associated with the first frame. This value for the starting time indicates that the score at state 705 represents a word that started at a time corresponding to the first frame. The starting time moves with the score as the score propagates through the lexical tree.

After the second frame is retrieved (row 910), the score for the state 800 ($S_{A2}$) is set equal to the sum of the previous score for the state ($S_{A1}$) and the acoustic score ($A_{A2}$) resulting from an acoustic match of the second frame with the acoustic model for silence:

$$S_{A2}=S_{A1}+A_{A2}=A_{A1}+A_{A2}.$$

As noted above, each of the scores corresponds to a negative logarithmic probability. Accordingly, adding scores together corresponds to multiplying the probabilities. Thus, the score for the state 800 ($S_{A2}$) equals the likelihood that both of the first and second frames correspond to silence. This process is repeated for subsequent frames (e.g., lines 915 and 920) so that the score for the state 800 at a frame "n" ($S_{An}$) equals:

$$S_{An} = S_{An-1} + A_{An} = \sum_{m=1}^{n} A_{Am}.$$

This expression assumes that the silence node 512 is not reseeded from the root node 505. If reseeding occurs at a frame n, then the value of $S_{An-1}$ would be replaced by the score in the root node 505 for the frame n−1.

After the second frame is retrieved, the score for the state 705 ($S_{B2}$) is set equal to:

$$S_{B2}=min(S_{B1}+stay_B, S_{A1})+A_{B2},$$

where $A_{B2}$ is the acoustic score resulting from an acoustic match of the second frame with the acoustic model corresponding to state 705 and stay, is the staying penalty for state 705. The score for state 705 ($S_{B2}$) corresponds to the more likely of two alternatives: (1) the first frame was silence and the second frame was the sound represented by the state 705 or (2) both of the first and second frames were the sound represented by the state 705. The first alternative corresponds to a transition from state 800 to state 705 along the path 810. The second alternative corresponds to a transition from state 705 back to state 705 along path 720. When the first alternative is the more likely, the starting time corresponding to the first frame that was stored previously for the state 705 is replaced by a value corresponding to the second frame. This value indicates that the score at state 705 represents a word that started with the second frame.

After the second frame is retrieved, the state 710 becomes an active state. The score for the state 710 ($S_{C2}$) is set equal to:

$$S_{CS}=S_{B1}+leave_B+A_{C2},$$

where $A_{C2}$ is the acoustic score resulting from an acoustic match of the second frame with the acoustic model corresponding to state 710 and $leave_B$ is the leaving penalty for the state 705. Similarly, $leave_C$ and $leave_D$ are leaving penalties for, respectively, states 710 and 715. The sum of language model components of $leave_B$, $leave_C$ and $leave_D$ represents the language model score for the phoneme represented by the node 700.

The methodology for determining state scores for states other than the silence state can be expressed more generally as:

$$S_{i,j}=min(S_{i,j-1}30\ stay_i, S_{i-1,j-1}+leave_{j-1})+A_{i,j}.$$

for i greater than zero (where i equals zero corresponds to silence), and with the boundary condition that the score for an inactive state equals infinity or some sufficiently large value. The starting time for the state may be represented as:

$$t_{i,j}=t_{i,j-1} for\ S_{i,j-1}+stay_i \leq Si-1,j-1+leave_{j-1},$$

or $$t_{i,j}=t_{i-1,j-1} for\ S_{i,j-1}+stay_i>Si-1,j-1+leave_{j-1,}$$

for i and j greater than zero and with the boundary condition that the time value for a newly active state represents the frame at which the state became active. As previously noted, state scores for the silence state may be determined as: with the boundary condition that $S_{0,0}$ equals zero. An even more general form, in which the scores are expressed as $$S_{0,j} = S_{0,j-1} + A_{0,j} = \sum_{m=1}^{j} A_{0,m}.$$

functions of the various parameters, is illustrated in FIG. 10.

Figure 11:
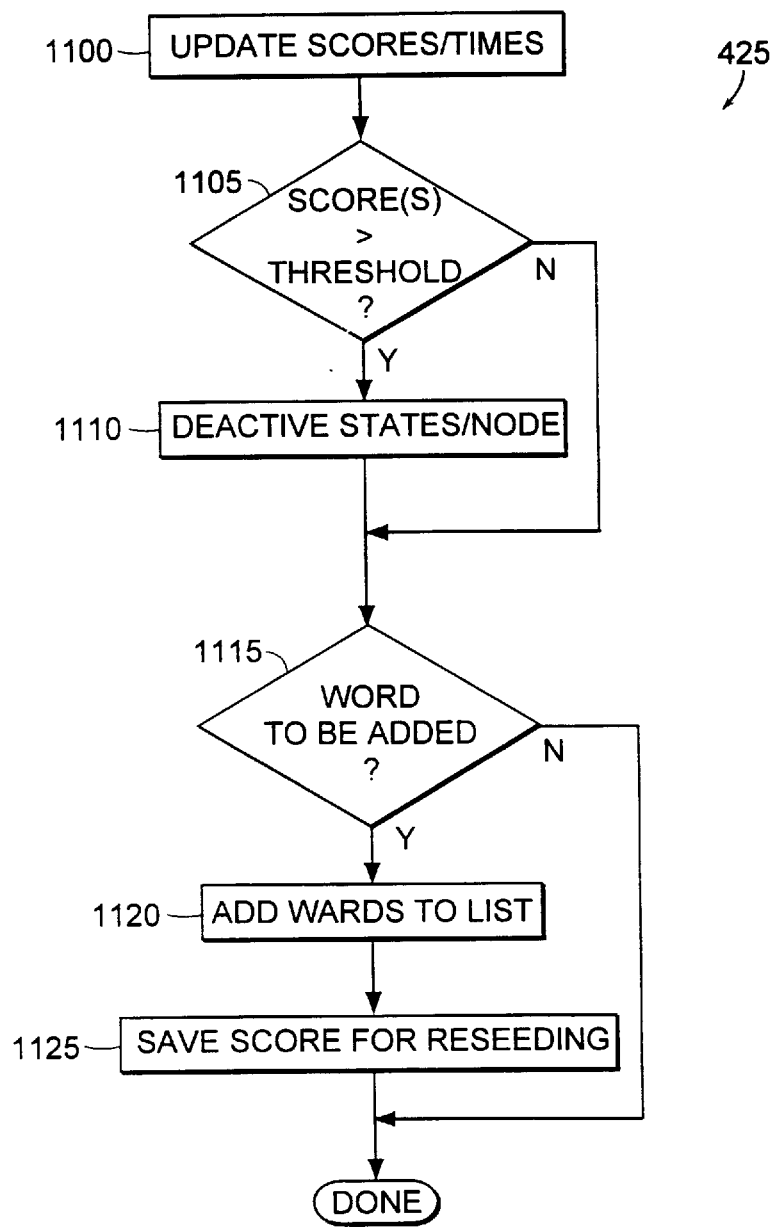
FIG. 11 is a flow chart of a procedure for processing nodes of a lexical tree.

Referring to FIG. 11, a node may be processed according to a procedure 425. Initially, the processor 130 updates the scores and time values for each state of the node (step 1100). The processor updates the scores and time values by generating acoustic scores and using the equations discussed above.

When the last state of the node was active prior to updating the scores for the node, the processor uses the score for the last state to generate scores for any inactive subnodes of the node. If the generated score for a subnode does not exceed a pruning threshold, then the processor activates that subnode and provides the subnode with the generated score.

Next, the processor determines whether the score of any state of the node exceeds the pruning threshold (step 1105). When a score exceeds the pruning threshold, the likelihood that the word represented by the score was spoken is deemed to be too small to merit further consideration. For this reason, the processor prunes the lexical tree by deactivating any state having a score that exceeds the pruning threshold (step 1110). If every state of the node is deactivated, then the processor also deactivates the node. The processor may deactivate a node or state by deleting a record associated with the node or state, or by indicating in the record that the node or state is inactive. Similarly, the processor may activate a node or state by creating a record and associating the record with the node or state, or by indicating in an existing record that the node or state is active.

The processor may use a dynamic pruning threshold ($T_{dynamic}$) that accounts for variations in the average or best score in the lexical tree at any given time. The dynamic pruning threshold may be viewed as the sum of a fixed pruning threshold and a normalization factor (norm). In this case, the processor deactivates any state j for which:

$$S_j > T_{dynamic} = T_{fixed} + norm.$$

The normalization factor (norm) could correspond, for example, to the lowest score in the lexical tree from the previous frame. The normalization factor also could be determined by computing exactly the lowest score in the lexical tree for the current frame in a first pass through the lexical tree and then comparing all of the scores to a threshold based on that score during a second pass through the lexical tree. The second approach tends to be more accurate because it includes the comparison with the current frame. However, the second approach requires the additional processing associating with making two passes through the lexical tree.

An implementation of the technique uses an estimate of the comparison with the current frame to obtain most of the benefit of the second approach while only requiring a single pass through the lexical tree. In the implementation, state scores for the silence state are determined as:

$$S_{0,j} = S_{0,j-1} + A_{0,j} - norm_j,$$

with the boundary condition that $S_{0,0}$ equals zero. Scores for other states are determined as:

$$S_{i,j} = min(S_{i,j-1} + stay_i, S_{i-1,j-1} + leave_{i-1}) + A_{i,j} - norm_j,$$

for i greater than zero (where i equals zero corresponds to silence), and with the boundary condition that the score for an inactive state is some large value. The value for $norm_j$ corresponds to the updated score (without normalization) for the state ($S_x$) that had the lowest score in the previous frame (j−1):

$$S_{x,j} = S_{x,j-1} + A_{x,j}.$$

Use of this normalization factor means that if the state having the lowest score in the previous frame remains as the state having the lowest score in the current frame, then the state will have a score equal to the staying penalty associated with the state ($stay_x$).

In another implementation of the procedure 425, the processor 130 implements pruning as a substep of the step of updating scores for the states (step 1100). The processor monitors the scores during the updating process and immediately deactivates a state when the score of the state exceeds the pruning threshold. This approach permits the processor to reduce processing associated with the acoustic match.

A state may be represented by two types of acoustic models: a right generic model that accounts for the effects of a preceding sound on the sound represented by the state and a doubly generic model that considers the sound independently of the preceding sound. The processor only compares a frame with a particular acoustic model once, and reuses the score resulting from the comparison if additional states are represented by the same acoustic model. Since there are considerably fewer doubly generic models than there are right generic models, a comparison of a frame with a doubly generic model is more likely to be reusable than a comparison of the frame with a right generic model. Accordingly, doubly generic models tend to require less processing than do right generic models.

For this reason, the processor 130 first performs the acoustic match using the doubly generic model. If the resulting score exceeds a quality threshold, then the processor keeps the score. If the resulting score does not exceed the quality threshold, then the processor performs the acoustic match using the right generic model and updates the score using the results of that acoustic match. Thereafter, the processor compares the score to the pruning threshold and deactivates the state when the score exceeds the pruning threshold.

The processor further reduces the processing associated with making the acoustic match by using acoustic scores generated for the previous frame when the current frame is separated from the previous frame by less than a predetermined amount. The processor determines the separation between the current frame and the previous frame by computing the Euclidean distance between the two frames as the sum of the squares of the differences between corresponding parameters of the two frames.

Next, the processor 130 determines whether a word is to be added to a list of words (step 1115). A word is added to the list of words when the node being processed corresponds to the last phoneme of a word, a score has been propagated out of the last state of the node, and the score is less than a list threshold. Before comparing the score to the list threshold, the processor adds a language model score to the score. The language model score corresponds to the difference between the language model score for the word to the incremental language model score that is already included in the score. In general, the list threshold has a lower value than the pruning threshold. If the node being processed corresponds to the last phoneme of multiple words having the same phonetic spelling, then all of the words to which the node corresponds are added to the list of words.

If the noted conditions are met, the processor adds the word or words to the list (step 1120). A word is stored in the list of words along with the score propagated out of the last state. If the word is on the list already, then the processor stores with the list the better of the score already stored with the list or the score propagated out of the last state. The scores for words in a list of words are returned along with the list of words. The procedure 250 uses these scores in making the detailed match.

The processor 130 also adds the word to lists of words for times that precede or follow the starting time. The processor does this to account for possible inaccuracies in the starting time of the word that may result from selecting the better of a score that remains in a state or a score propagated from a prior state. By spreading the word across multiple lists, the processor ensures that these inaccuracies will not impinge on the accuracy of the speech recognition system.

The processor spreads the word across multiple lists based on the length of the word. In particular, the processor adds the word to lists for times spaced up to one half the length of the word from the starting time, so long as half the length of the word does not exceed a maximum amount (e.g., ten frames). For example, when a word is twenty frames long, the processor adds the word to lists of words corresponding to the ten frames that precede the frame represented by the starting time ("the starting frame") and to the ten frames that follow the starting frame. The processor weighs the score of the word based on the distance of the frame for a particular list from the starting frame. For example, the processor might add a penalty of 25 to the score for each frame of separation from the starting frame. The processor does not add the word to any list for which the weighting causes the score to exceed the threshold value. In this example, more words may be added to the word list for the requested time (step 440) so long as there are active nodes in the lexical tree corresponding to speech that started ten frames after the start time for which the list was requested or earlier and the last frame to be processed corresponds to a time that is at least ten frames after the start time.

After adding a word to the list of words (step 1120), the processor saves the score associated with the word as a reseeding score for use in reseeding the tree (step 1125). Production of a word by the lexical tree means that the current frame may correspond to the last frame of the word (with the probability of such a correspondence being reflected by the score associated with the word). This means that the next frame may correspond to the beginning of a word or to silence resulting from a pause between words. The processor 130 reseeds the tree (step 430 of FIG. 4) to account for this possibility.

For a given frame, multiple nodes may produce words. However, the tree only needs to be reseeded once. To account for this, the processor only saves the score associated with a word ($S_W$) as the reseeding score ($S_{RS}$) if the word is the first word to be generated by the tree for the current frame of if the word score is less than the score for all other words generated by previously-processed nodes for the current frame ($S_{RS}'$):

$$S_{RS} = min(S_W, S_{RS}')$$

By saving only the lowest score (i.e., the score indicating the highest probability that the current frame was the last frame of a word), the processor ensures that the tree will be reseeded using the highest probability that the next frame is the first frame of a new word.

To reseed the tree (step 430 of FIG. 4), the processor activates the root node 505 and associates the minimum of the reseeding score ($S_{RS}$) and the score for the silence node 512 with the root node. During processing of the next frame, the active root node 505 may be used to activate nodes in the group 510 or to activate the silence node 512.

Processing of the node is complete after the processor saves a score for use in reseeding the tree (step 1125), or if no word is to be added to the list of words (step 1115).

The processor may employ other techniques to reduce processing associated with the procedure 255. For example, if the lexical tree includes sequential nodes that have no branches (e.g., a first node that is the only subnode of a second node that is itself the only subnode of a third node), the processor replaces those nodes with a single node.

In another variation, the processor 130 might employ a phoneme look-ahead technique when faced with a branch in the lexical tree. When a node is passing a score to several subnodes, the processor performs a relatively crude acoustic match for each subnode. In particular, the processor averages the next four frames to produce a smooth frame and compares the smooth frame to a smooth acoustic model for the phoneme corresponding to each subnode to generate a crude acoustic score for each subnode. The smooth acoustic model is context-independent and represents the first smoothed frame of the phoneme. For each subnode, the processor adds the crude acoustic score and a portion of the incremental language model score for the node to the score for the node. The processor eliminates any subnodes for which the crude score exceeds a second pruning threshold. Thereafter, the processor performs a more refined acoustic match for the remaining subnode(s).

The processor 130 further reduces processing by associating an active subnode count with each node. Thereafter, when the processor prunes a node, the processor decrements the count for each parent of the node. Similarly, the processor increments the count for each parent of a node when the processor activates the node. These counts simplify identification of the first and last active node. The processor also stores sibling nodes (i.e., nodes that are direct subnodes of the same node) successively in memory, with each node including a pointer to the node's first subnode.

Other embodiments are within the scope of the following claims.

What is claimed is:

1. A method of using lexical tree pre-filtering to identify sets of words for use in recognizing speech, the method comprising:

representing a vocabulary of words using a lexical tree;

identifying a first subset of the vocabulary that may correspond to speech spoken beginning at a first time by propagating through the lexical tree information about the speech spoken beginning at the first time;

identifying a second subset of the vocabulary that may correspond to speech spoken beginning at a second time by propagating through the lexical tree information about the speech spoken beginning at the second time; and recognizing words included in the speech by comparing speech spoken beginning at the first time with words from the first subset of the vocabulary and speech spoken beginning at the second time with words from the second subset of the vocabulary;

wherein a state of the lexical tree is not reset between the first and second identifying steps so that the state of the lexical tree at initiation of the second identifying step corresponds to the state of the lexical tree at conclusion of the first identifying step.

2. The method of claim 1, wherein the step of identifying a first subset of the vocabulary includes performing a coarse comparison of the speech spoken beginning at the first time with words in the vocabulary.

3. The method of claim 2, wherein the coarse comparison includes propagating scores through the lexical tree.

4. The method of claim 3, wherein the coarse comparison includes associating a starting time with a score.

5. The method of claim 4, wherein the coarse comparison includes moving the starting time with the score as the score propagates through the lexical tree.

6. The method of claim 3, wherein a word is produced by the coarse comparison when a score corresponding to the word propagates out of a node of the lexical tree corresponding to the word.

7. The method of claim 6, wherein the first subset of the vocabulary comprises a first list of words, and wherein the first identifying step further comprises adding to the first list of words a word produced by the coarse comparison.

8. The method of claim 7, wherein:

a first time is associated with the first list of words, the coarse comparison includes associating a starting time with a score, and the first identifying step comprises adding a word to the first list of words when a starting time associated with a score corresponding to the word equals the first time.

9. The method of claim 8, wherein the first identifying step further comprises:

maintaining multiple lists of words, each of which is associated with a particular time, and adding the word to lists of words that are associated with times that precede or follow the first time by up to a certain time interval.

10. The method of claim 9, wherein the time interval is related to the length of the word.

11. The method of claim 9, wherein the step of adding the word to the first list of words further comprises adding a first score associated with the word to the first list of words.

12. The method of claim 10, wherein the step of adding the word to lists of words that are associated with times that precede or follow the first time by up to a certain time interval further comprises:

modifying the first score based on a difference between the first time and a time associated with a particular list of words to produce a modified score, and adding the modified score to the particular list of words in association with the word.

13. The method of claim 7, wherein the step of adding the word to the first list of words further comprises adding a first score associated with the word to the first list of words.

14. The method of claim 3, wherein the lexical tree includes nodes that each represent a phoneme so that each word of the vocabulary is represented by a sequence of nodes that together correspond to a sequence of phonemes that define the word, and wherein the step of propagating scores through the lexical tree comprises propagating scores between the nodes of the lexical tree.

15. The method of claim 14, wherein a language model score that represents a likelihood with which a word including the phoneme represented by the node occurs in speech is associated with each node, and wherein the step of propagating scores through the lexical tree comprises adding a language model score associated with a node to a score propagating from the node.

16. The method of claim 15, wherein a language model score associated with a node corresponds to an increase in a best language model score from a branch of the lexical tree that starts with a parent of the node to a branch of the lexical tree that starts with the node.

17. The method of claim 14, wherein, when a score is to be propagated from a node to several subnodes, the method further comprises, for each subnode:

performing a relatively crude acoustic match, adding to the score for the node results of the crude match to produce a subnode score, comparing the subnode score to a threshold value, eliminating the subnode when the subnode score does not meet the threshold value, and performing a more refined acoustic match for the subnode when the subnode score meets the threshold value.

18. The method of claim 17, wherein the relatively crude acoustic match is based on a phoneme corresponding to the subnode.

19. The method of claim 17, wherein the relatively crude acoustic match is based on speech spoken after speech corresponding to the node.

20. The method of claim 19, wherein the speech is divided into frames and the relatively crude acoustic match is based on an average of multiple frames.

21. The method of claim 3, wherein the step of propagating scores comprises normalizing the scores.

22. The method of claim 21, wherein the step of normalizing the scores comprises, for a first time increment, subtracting from the scores an updated version of a best score for a second time increment.

23. The method of claim 3, wherein the step of recognizing words included in the speech utilizes scores propagated for words in the first subset of the vocabulary during the coarse comparison.

24. The method of claim 2, wherein the coarse comparison of the speech spoken beginning at the first time with words in the vocabulary comprises:

comparing the speech with a first speech model associated with a node of the lexical tree to produce a first score associated with the node, comparing the first score to a first threshold, when the first score does not meet the threshold, saving the first score as a score for the node, and when the first score meets the threshold, comparing the speech with a second, more accurate speech model associated with the node to produce a second score associated with the node and saving the second score as the score for the node.

25. The method of claim 24, wherein the first speech model is independent of the context of the node and the second speech model depends on the context of the node.

26. The method of claim 1, wherein the lexical tree includes active nodes and inactive nodes and wherein information for a particular increment of the speech is propagated through the lexical tree by:

selecting a node that has not been processed for the particular increment and that has no active subnodes that have not been processed for the particular increment, processing the selected active node, and repeating the selecting and processing steps until all active nodes have been processed.

27. An apparatus for using lexical tree prefiltering to identify sets of words for use in recognizing speech, the apparatus comprising:

means for representing a vocabulary of words using a lexical tree;

means for identifying a first subset of the vocabulary that may correspond to speech spoken beginning at a first time by propagating through the lexical tree information about the speech spoken beginning at the first time;

means for identifying a second subset of the vocabulary that may correspond to speech spoken beginning at a second time by propagating through the lexical tree information about the speech spoken beginning at the second time; and means for recognizing words included in the speech by comparing speech spoken beginning at the first time with words from the first subset of the vocabulary and speech spoken beginning at the second time with words from the second subset of the vocabulary;

wherein a state of the lexical tree is not reset between identifying the first and second subsets of the vocabulary so that the state of the lexical tree at initiation of identifying the second subset corresponds to the state of the lexical tree at conclusion of identifying the first subset.

28. A speech recognition system that uses lexical tree pre-filtering to identify sets of words for use in recognizing speech, the system comprising:

an input device configured to convert speech into a digital signal, and a processor configured to:

represent a vocabulary of words using a lexical tree;

identify a first subset of the vocabulary that may correspond to speech spoken beginning at a first time by propagating through the lexical tree information about the speech spoken beginning at the first time;

identify a second subset of the vocabulary that may correspond to speech spoken beginning at a second time by propagating through the lexical tree information about the speech spoken beginning at the second time; and recognize words included in the speech by comparing a portion of the digital signal corresponding to speech spoken beginning at the first time with words from the first subset of the vocabulary and a portion of the digital signal corresponding to speech spoken beginning at the second time with words from the second subset of the vocabulary;

wherein the processor is further configured to maintain the state of the lexical tree between identifying the first and second subsets of the vocabulary so that the state of the lexical tree at initiation of identifying the second subset corresponds to the state of the lexical tree at conclusion of identifying the first subset.

29. Computer software, residing on a computer-readable storage medium, comprising instructions for causing a computer to:

represent a vocabulary of words using a lexical tree;

identify a first subset of the vocabulary that may correspond to speech spoken beginning at a first time by propagating through the lexical tree information about the speech spoken beginning at the first time;

identify a second subset of the vocabulary that may correspond to speech spoken beginning at a second time by propagating through the lexical tree information about the speech spoken beginning at the second time;

recognize words included in the speech by comparing speech spoken beginning at the first time with words from the first subset of the vocabulary and speech spoken beginning at the second time with words from the second subset of the vocabulary; and maintain the lexical tree between identifying the first and second subsets of the vocabulary so that the state of the lexical tree at initiation of identifying the second subset corresponds to the state of the lexical tree at conclusion of identifying the first subset.

30. A method of using lexical tree pre-filtering to identify sets of words for use in recognizing speech, the method comprising:

representing a vocabulary of words using a lexical tree;

identifying a first subset of words from the vocabulary, the first subset including words that may correspond to speech spoken beginning at a first time, by propagating through the lexical tree information about the speech spoken beginning at the first time;

identifying a second subset of words from the vocabulary, the second subset including words that may correspond to speech spoken beginning at a second time, by propagating through the lexical tree information about the speech spoken beginning at the second time;

recognizing words included in the speech by comparing speech spoken beginning at the first time with words from the first subset of the vocabulary and speech spoken beginning at the second time with words from the second subset of the vocabulary; and maintaining a state of the lexical tree between the first and second identifying steps so that the state of the lexical tree at initiation of the second identifying step corresponds to the state of the lexical tree at conclusion of the first identifying step.

* * * * *